(12) United States Patent
Kerr, Jr.

(10) Patent No.: US 6,634,901 B2
(45) Date of Patent: Oct. 21, 2003

(54) QUICK CONNECT DEVICE FOR ELECTRICAL FIXTURE

(75) Inventor: Jack Russell Kerr, Jr., College Station, TX (US)

(73) Assignee: Angelo Fan Brace Licensing, LLC, Philadelphia, PA (US)

(*) Notice: Subject to any disclaimer, the term of this patent is extended or adjusted under 35 U.S.C. 154(b) by 0 days.

(21) Appl. No.: 10/066,962

(22) Filed: Feb. 4, 2002

(65) Prior Publication Data

US 2003/0148649 A1 Aug. 7, 2003

(51) Int. Cl.⁷ ............................................. H01R 13/625
(52) U.S. Cl. ........................ 439/333; 439/332; 439/537
(58) Field of Search ................................. 439/332, 333, 439/334, 321, 537, 313; 174/52, 54, 61, 51; 416/5, 214, 244; 220/3.2, 3.9

(56) References Cited

U.S. PATENT DOCUMENTS

| | | |
|---|---|---|
| 484,911 A | 10/1892 | Green |
| 969,409 A | 9/1910 | Russell |
| 1,030,007 A | 6/1912 | Miller |
| 1,222,837 A | 4/1917 | Winslow et al. |
| 1,361,785 A | 12/1920 | Tucker |
| 1,486,896 A | 3/1924 | Hubbell |
| 1,506,522 A | 8/1924 | Gansel |
| 1,583,864 A | 5/1926 | Tucker |
| 1,595,972 A | 8/1926 | DeReamer |
| 1,636,278 A | 7/1927 | Benjamin |
| 1,646,806 A | 10/1927 | Benjamin |
| 1,666,223 A | 4/1928 | Symmes |
| 1,666,411 A | 4/1928 | D'Olier, Jr. |
| 1,701,935 A | 2/1929 | Ryan |
| 1,702,888 A | 2/1929 | Balch |
| 1,742,438 A | 1/1930 | D'Olier, Jr. |
| 1,796,036 A | 3/1931 | Mangin |
| 2,336,385 A | * 12/1943 | Batcheller ..................... 24/30 |
| 2,349,924 A | 5/1944 | Anderson .................... 248/343 |
| 2,355,913 A | 8/1944 | Simon ......................... 173/328 |
| 2,414,173 A | 1/1947 | Schuman ...................... 174/52 |
| 2,547,896 A | 4/1951 | Wellen ........................ 230/241 |
| 2,671,821 A | 3/1954 | Zientowski et al. .......... 174/54 |

(List continued on next page.)

FOREIGN PATENT DOCUMENTS

| | | | |
|---|---|---|---|
| CH | 223834 | 12/1942 | |
| DE | 456372 | 2/1928 | |
| FR | 674.956 | 2/1930 | |
| FR | 1 167 763 | 11/1958 | |
| FR | 1.331.492 | 6/1965 | |
| GB | 2299 of 1905 | 1/1906 | |
| GB | 2481 of 1908 | 5/1908 | ................. 439/333 |
| GB | 6867 of 1914 | 3/1915 | |
| GB | 182097 | 8/1923 | |
| GB | 1073791 | 6/1967 | |
| GB | 2 149 013 A | 6/1985 | |
| JP | 5-157092 A | 6/1993 | |

*Primary Examiner*—Alexander Gilman
(74) *Attorney, Agent, or Firm*—Drinker Biddle & Reath LLP

(57) ABSTRACT

A ceiling fan or light fixture is provided with a quick connect device comprises an upper support member attached to a ceiling and defining at least one upwardly-facing load-bearing surface, and a lower support member attached to and supporting the fixture and defining at least one downwardly-facing load-bearing surface resting on an upwardly-facing load-bearing surface of the upper support member. Electrical-contacts project from one of the load-bearing surfaces, and are received in recesses in another of the load-bearing surfaces, within which are corresponding contacts. The projecting contacts engaging in the recesses prevent the load-bearing surfaces from being separated horizontally unless they are first lifted vertically out of engagement.

13 Claims, 2 Drawing Sheets

U.S. PATENT DOCUMENTS

| | | | | |
|---|---|---|---|---|
| 2,766,434 | A | 10/1956 | Gear | 339/122 |
| 2,933,240 | A | 4/1960 | Breese | 230/259 |
| 2,941,178 | A | 6/1960 | Hubbell et al. | 439/333 |
| 2,990,153 | A | 6/1961 | Wolar | 248/343 |
| 3,017,469 | A | 1/1962 | Giller | 200/52 |
| 3,302,918 | A | 2/1967 | Cohen | 248/343 |
| 3,356,840 | A | 12/1967 | Cohen | 240/78 |
| 3,401,874 | A | 9/1968 | Covington | 230/241 |
| 3,523,267 | A | 8/1970 | Pauza | 439/333 |
| 3,725,840 | A | 4/1973 | Hesse | 339/14 R |
| 3,798,584 | A * | 3/1974 | Person | 339/14 |
| 3,894,781 | A | 7/1975 | Donato | 439/121 |
| 4,098,547 | A | 7/1978 | Wrobel | 339/91 R |
| 4,160,576 | A | 7/1979 | Vettori | 339/119 R |
| 4,357,506 | A | 11/1982 | Breining | 200/52 R |
| 4,402,649 | A | 9/1983 | Laurel | 416/5 |
| 4,403,824 | A | 9/1983 | Scott | 339/186 R |
| 4,448,388 | A | 5/1984 | Dennis et al. | 248/663 |
| 4,515,538 | A | 5/1985 | Shih | 417/572 |
| 4,531,796 | A | 7/1985 | Gansert et al. | 439/321 |
| 4,548,554 | A | 10/1985 | Angott | 417/572 |
| D283,156 | S | 3/1986 | Mandelli et al. | D23/158 |
| 4,637,673 | A | 1/1987 | Yang | 339/89 M |
| 4,645,286 | A | 2/1987 | Isban et al. | 439/450 |
| 4,645,289 | A | 2/1987 | Isban | 439/101 |
| 4,711,161 | A | 12/1987 | Swin, Sr. et al. | 98/31.5 |
| 4,721,480 | A | 1/1988 | Yung | 439/527 |
| 4,725,240 | A | 2/1988 | Braverman | 439/105 |
| 4,729,725 | A | 3/1988 | Markwardt | 417/423 R |
| 4,776,761 | A | 10/1988 | Diaz | 416/5 |
| 4,788,383 | A | 11/1988 | Caison | 174/54 |
| 4,808,071 | A | 2/1989 | Chau | 416/5 |
| 4,810,207 | A | 3/1989 | Butterfield | 439/529 |
| 4,880,128 | A | 11/1989 | Jorgensen | 220/3.9 |
| 4,884,947 | A | 12/1989 | Rezek | 416/5 |
| 4,919,292 | A | 4/1990 | Hsu | 220/3.2 |
| 4,929,187 | A | 5/1990 | Hudson et al. | 439/334 |
| 4,952,157 | A | 8/1990 | Hudson et al. | 439/92 |
| 4,988,067 | A | 1/1991 | Propp et al. | 248/343 |
| 5,069,601 | A | 12/1991 | Shawcross | 417/360 |
| 5,072,341 | A | 12/1991 | Huang | 362/96 |
| 5,090,654 | A | 2/1992 | Ridings et al. | 248/343 |
| 5,094,676 | A | 3/1992 | Karbacher | 55/316 |
| 5,108,260 | A | 4/1992 | Monrose, III et al. | 416/142 |
| RE34,147 | E | 12/1992 | Rezek | 416/5 |
| 5,180,284 | A | 1/1993 | Monrose, III et al. | 416/204 R |
| 5,242,269 | A | 9/1993 | Chang | 416/244 |
| 5,376,020 | A | 12/1994 | Jones | 439/537 |
| 5,383,765 | A | 1/1995 | Baxter et al. | 416/62 |
| 5,403,198 | A | 4/1995 | Koganemaru et al. | 439/333 |
| 5,421,701 | A | 6/1995 | Funston | 415/5 |
| 5,507,619 | A | 4/1996 | Ryan | 416/5 |
| 5,558,537 | A | 9/1996 | Su | 439/537 |
| 5,567,117 | A | 10/1996 | Gunn et al. | 416/244 R |
| 5,568,968 | A | 10/1996 | Jaramillo | 362/376 |
| 5,586,867 | A | 12/1996 | Mehlos | 417/45 |
| 5,658,129 | A | 8/1997 | Pearce | 416/5 |
| 5,714,963 | A | 2/1998 | Cox | 343/772 |
| 5,738,437 | A | 4/1998 | Ilagan | 362/363 |
| 5,738,496 | A | 4/1998 | Mehta | 417/44.1 |
| 5,762,223 | A | 6/1998 | Kerr, Jr. | 220/3.9 |
| 5,800,049 | A | 9/1998 | Todd, Jr. | 362/294 |
| 5,845,988 | A | 12/1998 | Mandall | 362/376 |
| 5,860,548 | A | 1/1999 | Kerr, Jr. | 220/3.2 |
| 5,893,628 | A | 4/1999 | Byers | 362/252 |
| 5,900,583 | A | 5/1999 | Russo | 174/61 |
| 5,951,197 | A | 9/1999 | Wu | 403/315 |
| 5,951,253 | A | 9/1999 | Gajewski | 416/214 |
| 5,954,304 | A | 9/1999 | Jorgensen | 248/200.1 |
| 5,954,449 | A | 9/1999 | Wu | 403/315 |
| 5,963,432 | A | 10/1999 | Crowley | 361/804 |
| 5,984,640 | A | 11/1999 | Wang | 416/244 R |
| 6,036,154 | A | 3/2000 | Pearce | 248/343 |
| 6,038,130 | A | 3/2000 | Boeck et al. | 361/735 |
| 6,146,191 | A | 11/2000 | Kerr, Jr. et al. | 439/537 |
| 6,171,061 | B1 | 1/2001 | Hsu | 416/244 R |
| 6,325,654 | B1 | 12/2001 | Kerr, Jr. et al. | 439/313 |
| 6,335,486 | B1 | 1/2002 | Reiker | 174/51 |
| 6,364,612 | B1 | 4/2002 | Tseng | 416/210 R |

* cited by examiner

QUICK CONNECT DEVICE FOR ELECTRICAL FIXTURE

FIELD OF THE INVENTION

The field of the invention is electrical fixtures, and especially the overhead mounting of lighting fixtures, fans, and the like.

BACKGROUND OF THE INVENTION

The installation of a conventional ceiling fan or pendant ceiling lamp is a difficult task for a single installer. To install a conventional ceiling fan, the fan is lifted to just below an electrical junction box set into the ceiling, and is held there while connecting the fan wires to the electrical supply wires. After the electrical connection is finished, the fan is lifted further to place the fan bell over the junction box and held in that position while the fan is attached to the box or a ceiling hanger in some manner, typically with screws or bolts. The combined operation takes several minutes and usually requires two persons, one to lift and hold the fan and the other to make the wire and screw connections.

Quick connect devices have previously been proposed with which a single person can more easily install a ceiling fan. In particular, the present inventor has previously proposed various forms of quick connect device in which a cover plate is mechanically and electrically connected to a ceiling box. The cover plate and a connector attached to the fan are provided with plug-and-receptacle or similar electrical connectors, and with mechanical supports, intended to engage under rotation or sliding motion. The fan is then connected to the cover plate by lifting and sliding it, or lifting and rotating it. The fan is typically secured in place by set screws passing through parts of the cover plate and connector. However, it is conceivable that the set screws might become unscrewed, and that the connector might then rotate or slide far enough that the fan or other fixture becomes detached from the ceiling. This is, of course, an especial concern when a fan rotating about a vertical axis is mounted using a quick-mount fixture that is engaged by rotation about the same axis.

SUMMARY OF THE INVENTION

It is therefore an object of the present invention to provide an additional safeguard against the inadvertent disengagement of a quick connect device for hanging fans, lighting fixtures, and the like.

The current invention is a quick connect device for hanging fans, lighting fixtures, and the like. A connector is provided between the ceiling box and the electrical fixture that takes the weight of the fixture as it is inserted, which can be done by one person. The electrical connections are established by contacts on surfaces of the connector through which part of the weight of the fixture is transmitted to the ceiling box. The contacts project from one surface, and are recessed into the other. Thus, the electrical supply to the fixture is not established until the connector is correctly engaged, and the connector cannot be disengaged except by lifting the fixture to separate the projecting contacts from the recessed ones. Set screws may also be inserted to prevent disengagement of the connector. A fan bell or canopy may also be raised into position covering and the connector, and may provide a further level of security. The installer never needs to support the weight of the ceiling fixture while working on screw or wire connections.

One aspect of the invention provides a quick connect device for suspended electrical devices, comprising first and second support members. A first support member is adapted to be attached to and support an electrical device, and a second support member is adapted to be attached to and supported by an electrical ceiling box. The first support member has downwardly-facing load bearing surfaces evenly spaced around its periphery that, when the device is installed, rest on corresponding upwardly-facing load bearing surfaces on the second support member to transmit the weight of the device to the ceiling box. The load bearing surfaces are open at one end, permitting the load bearing surfaces on the first support member to be raised past those on the second support member and then rotated into alignment with them. Electrical contacts project from the load bearing surfaces on the first support member, and corresponding electrical contacts are recessed into the load bearing surfaces on the second support member, so that when the support members are correctly aligned the projecting electrical contacts drop into the recesses and establish electrical continuity from the electrical ceiling box to the fixture. The recesses are so shaped that the first support member, with the weight of the fixture attached, must be lifted vertically before the support surfaces can be rotated out of alignment.

As can be seen from the description and figures contained herein, hanging a fan or lighting fixture, particularly a heavy one, can be rendered a simple task using the quick connect device of this application.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim. In the drawings:

DETAILED DESCRIPTION OF THE DRAWINGS

Figure 1:
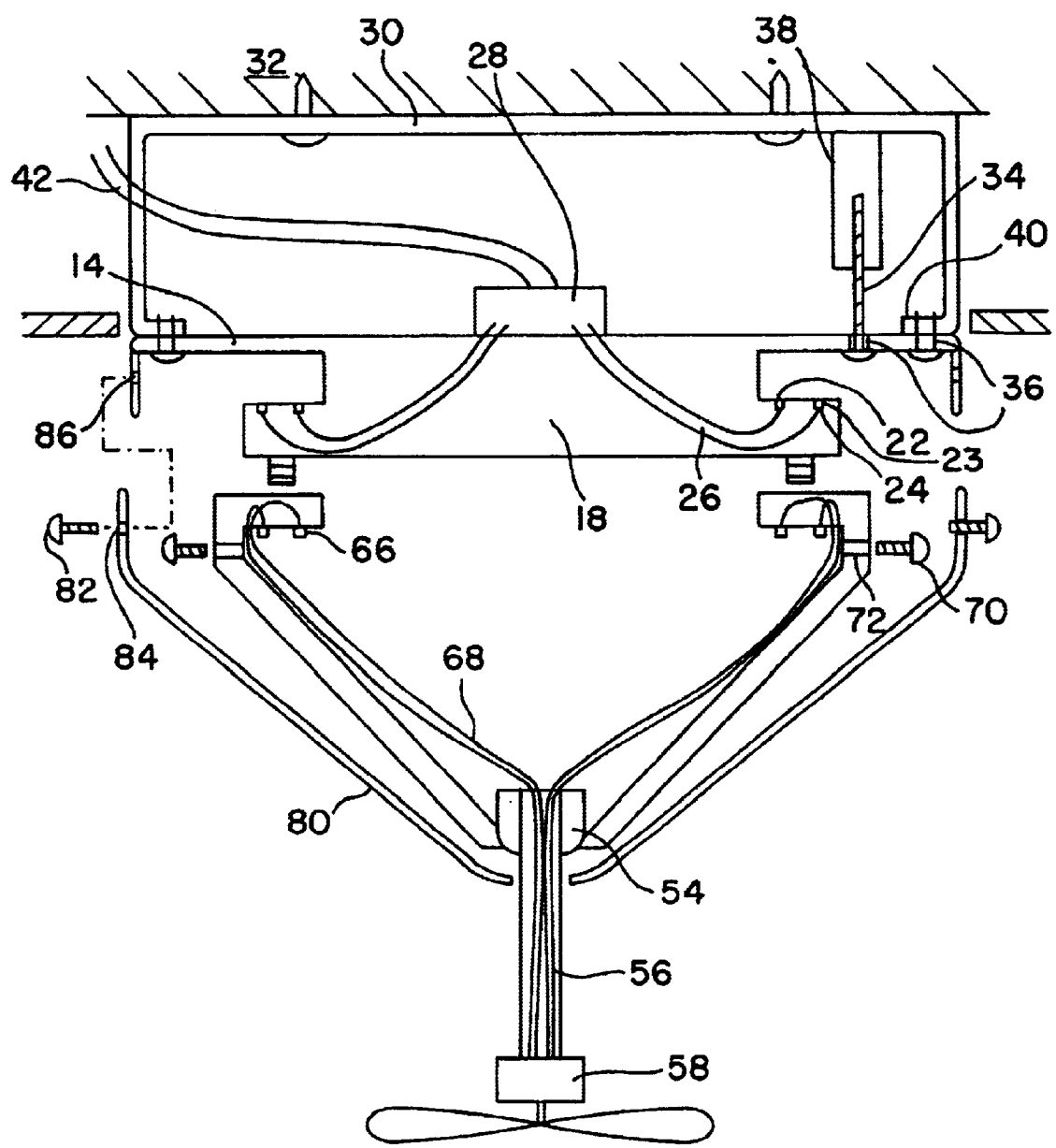
FIG. 1 is a schematic side elevation view of one embodiment of the quick connect device.
Figure 2:
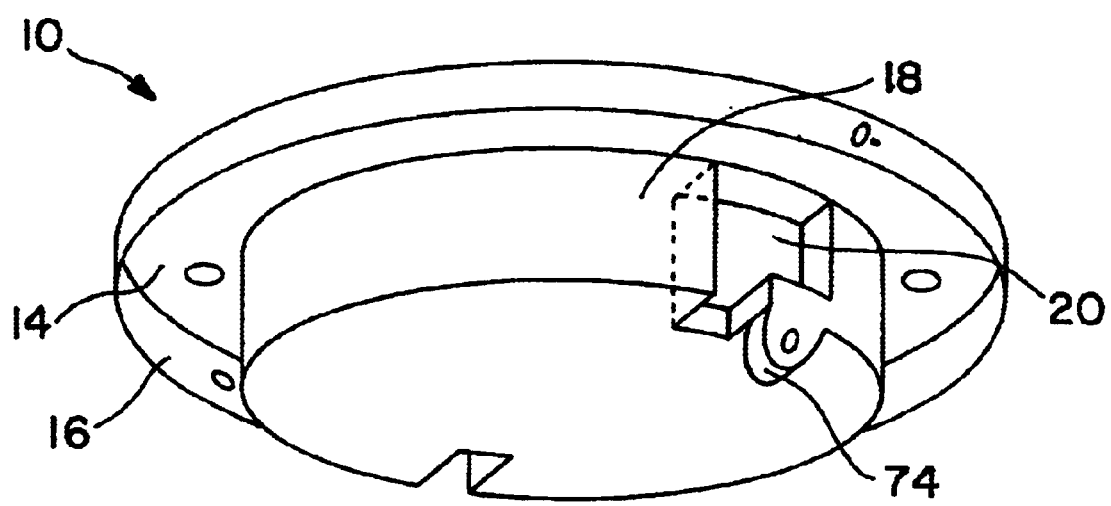
FIG. 2 is a perspective view from below of an upper part of the quick connect device shown in FIG. 1.
Figure 3:
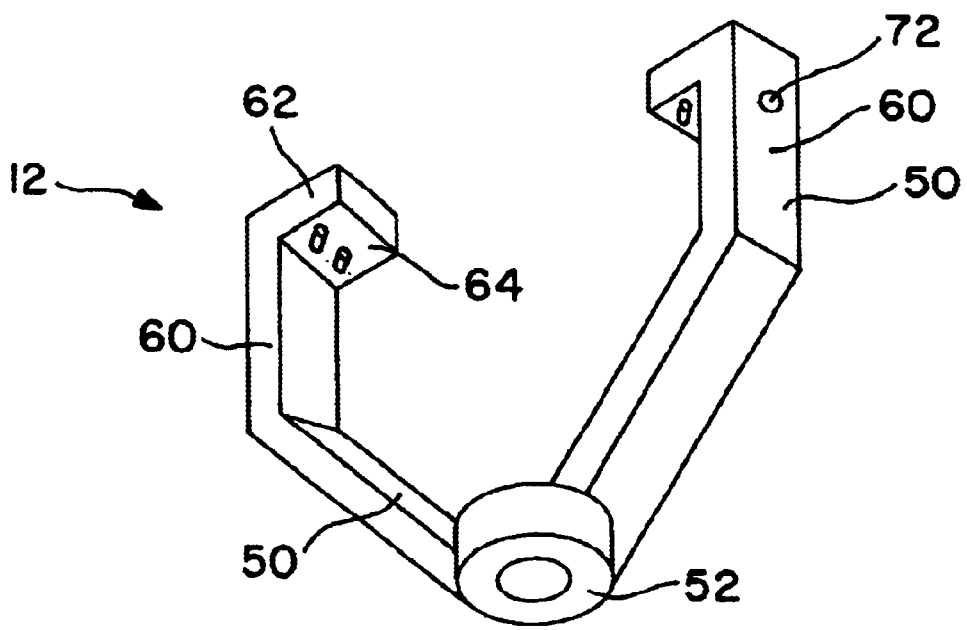
FIG. 3 is a perspective view from below of a lower part of the quick connect device shown in FIG. 1.

Referring to the drawings, one form of quick connect device according to the invention comprises an upper support member indicated generally by the reference numeral 10 and a lower support member indicated generally by the reference numeral 12. Throughout this description, terms denoting orientation or relative position are defined with respect to the orientation of the quick-connect device when supporting a fixture on the underside of a horizontal ceiling. It will be understood by the person skilled in the art how the device may be used, and adapted for use, in other orientations, and that when the device is not in use the components may be stored in any orientations and relative positions that may be expedient.

The upper support member 10 comprises a cover plate 14, an outer flange 16, and a central drum 18. These components may be fabricated from any suitable material in any suitable way. For example, the cover plate 14 and flange 16 may be stamped from a single piece of sheet metal, the drum 18 may be molded from plastic material, and the two may be screwed together. L-shaped channels 20 are formed in the sides of the drum 18. One arm of the L-shape opens out through the bottom face of the drum 18, while the other arm is defined on its underside by an upwardly-facing surface 22, in which are formed recesses 23 into which are recessed one or more electrical contacts 24. The electrical contacts 24 are connected by wires 26 to a connection block 28 on the top of the cover plate 14.

The upper support member 10 is shown in FIG. 1 attached to an electrical ceiling box 30, which is attached to a ceiling joist 32. The cover plate 14 is screwed to the ceiling box 30, for example, by screws 34 that pass through holes or keyhole slots 36 in the plate 14 and screw into internally threaded posts 38 or lugs 40 that are provided in standard load-bearing ceiling boxes. The electrical connector 28 is connected to wiring 42 that supplies the electrical box 30 from within the building. The wiring 42 may be connected to the connector 28 (or to stub wires extending from the connector 28) within the electrical box 30 before the cover plate 14 is screwed into place. All of the electrical and mechanical connections of the upper support member 10 to the ceiling will normally be completed before the electrical fixture that is to be attached to the ceiling is involved.

The lower support member 12 comprises two arms 50 attached to a ring 52. The ring 52 supports a ball 54, which is fastened to a down shaft 56, to which is mounted a fan 58. The two arms 50 extend upwards and outwards away from the ring 52, and their upper ends have vertical portions 60 that are spaced apart by the diameter of the drum 18. At the top ends of the vertical portions 60 are inturned ends 62, which define downwardly facing surfaces 64. Electrical contacts 66 project from the surfaces 64. The contacts 66 are connected to wires 68 that lead down through the down shaft 56 to supply electricity to the fan 58. It will be appreciated that any suitable fan mounting may be substituted, and that if a fixture other than a fan 58 is being installed then an appropriate other mounting may be substituted for the fan mounting 52, 54, 56.

The inhumed ends 62 of the arms 50 are dimensioned so that they can be passed upwards into the L-shaped channels 20 in the drum 18, and across above the load-bearing surfaces 22. The projecting contacts 66 are positioned to align with the recesses 23 containing the recessed contacts 24, so that the lower support member can be lowered until the load bearing surfaces 22 and 64 engage one another to support the weight of the fan 58, with the contacts 66 fitting into the recesses and engaging the contacts 24. The contacts 24 and 66 thus complete an electrical circuit between the building wiring 42 and the fan 58, while the engagement of the projecting contacts 66 in the recesses 23 prevents the lower support member 12 from rotating towards a position where the inturned ends 62 could drop out of the L-shaped channels 20. The lower mounting member 12 can be removed only if it is first lifted, against the weight of the fan 58, to separate the contacts 66 from the recesses.

Further to secure the lower mounting member 12, screws 70 may be passed through holes 72 in the vertical portions 60 of the arms 50, and into threaded bores in lugs 74 projecting from the drum 18.

A canopy or bell 80 may be placed over the mounting members 10 and 12, and fastened in place by screws 82 screwed into holes 84 in the rim of the bell 80 and into threaded holes 86 in the flange 16 of the upper mounting member. The bell may be merely decorative, or it may be a load-bearing member constructed to support the ball 54, and hence the fan 58, if the quick-release mounting should fail for any reason. It will be understood that if the bell 80 is to support the ball 54 then the opening in the bell surrounding the down shaft 56 must be smaller than the ball 54, so that the bell may be captive on the down shaft 56 when the ball 54, the down shaft 56, and the fan 58 are assembled.

It will be seen that the quick-release mounting described above, by a simple application of the law of gravity, can provide an exceptionally secure and reliable installation, without sacrificing the speed and ease of mounting that are important features of a quick-connect mounting. It will also be seen that the inaccessibility of the recessed contacts 24 negates the risk of electric shock if for any reason the fan 58 is removed while the power to the wiring 42 is not shut off.

The present invention may be embodied in still further specific forms without departing from the spirit or essential attributes thereof and, accordingly, reference should be made to the appended claims, rather than to the foregoing specification, as indicating the scope of the invention.

For example, although two channels 20 and two arms 50 have been shown, it will be appreciated that there may be three or more arms 50. In particular, having three or more arms would eliminate any tendency for the lower mounting member 12 to swing about an axis joining the load bearing surfaces 22 and 64.

Although the two channels 20 and the two arms 50 are shown as identical and symmetrical, it may be preferred to make them different, to ensure that each arm 50 is engaged with a specific channel 20. This may be desirable if the electrical wiring scheme requires that each contact 66 engage with a specific contact 24. Instead, correct electrical connection could be achieved by, for example, positioning the contacts 66 asymmetrically, and providing each channel 20 with a recess and contact 24 for every contact 66. Dummy projections, symmetrical with the contacts 66, could then be provided to improve the mechanical locking together of the upper and lower mounting members 10 and 12.

Although the contacts 66 and 24 are shown as cylindrical pins fitting into cylindrical recesses, other shapes are possible. In particular, as shown in the drawings the load-bearing surfaces 64 and 22 can only be separated in one direction (involving a clockwise rotation of the lower support member 12 as seen from above). The contacts 66 and 24 can therefore be asymmetrical, provided that they cooperate to prevent movement in that one direction.

What is claimed is:

1. A quick connect device for suspended electrical devices, comprising:
   an upper support member adapted to be attached to a ceiling and defining at least one upwardly-facing load bearing surface;
   a lower support member, adapted to be attached to and support an electrical device and defining at least one downwardly-facing load bearing surface;
   said lower support member being adapted to be supported by said upper support member by means of said at least one downwardly-facing load bearing surface resting on said at least one upwardly-facing load bearing surface;
   electrical contacts projecting from at least one of said load bearing surfaces;
   recessed electrical contacts in recesses defined in another of said load bearing surfaces;
   said projecting electrical contacts positioned to be received in said recesses to engage with said recessed electrical contacts when said at least one downwardly-facing load bearing surface rests on said at least one upwardly-facing load bearing surface, and to prevent horizontal separation of said load-bearing surfaces.

2. A quick connect device according to claim 1, wherein said support members are provided with holes for screws to retain said support members together.

3. A quick connect device according to claim 1, further comprising a bell adapted to be secured in a position covering said support members when said support members are in mating position.

4. A quick connect device according to claim 1, wherein said upper support member is provided with a cover plate adapted to be fastened to an electrical ceiling box.

5. A quick connect device according to claim 1, further comprising at least two said upwardly-facing load bearing surfaces and at least two downwardly-facing load bearing surfaces.

6. A quick connect device according to claim 5, wherein said load-bearing surface are arranged to be mated by raising, then rotating, then lowering said lower support member relative to said upper support member, and to be separated by reversing that sequence of operations.

7. A ceiling mountable electrical device, comprising:

a lower support member attached to the device and defining at least one downwardly-facing load-bearing surface; an upper support member adapted to be attached to a ceiling and defining at least one upwardly-facing load-bearing surface;

said lower support member being adapted to be supported by said upper support member by means of said at least one downwardly-facing load-bearing surface resting on said at least one upwardly-facing load-bearing surface;

electrical contacts projecting from at least one of said load-bearing surfaces;

recessed electrical contacts in recesses defined in another of said load-bearing surfaces;

said electrical contacts of said at least one upwardly-facing load-bearing surface being adapted to be connected to an electrical supply of said ceiling box and said electrical contacts of said at least one downwardly-facing load-bearing surface being connected to said electrical device;

said projecting electrical contacts positioned to be received in said recesses and to engage with said recessed electrical contacts and to prevent horizontal separation of said load-bearing surfaces when said at least one downwardly-facing load-bearing surface resting on said at least one upwardly-facing load-bearing surface.

8. An electrical device according to claim 7, which is a device selected from the group consisting of lamps and fans.

9. An electrical device according to claim 7, wherein said support members are provided with holes for screws to retain said support members together.

10. An electrical device according to claim 7, further comprising a bell adapted to be secured in a position covering said support members when said support members are in mating position.

11. An electrical device according to claim 7, wherein said upper support member is provided with a cover plate adapted to be fastened to an electrical ceiling box.

12. An electrical device according to claim 12, further comprising at least two said upwardly-facing load-bearing surfaces and at least two downwardly-facing load-bearing surfaces.

13. An electrical device according to claim 7, wherein said load-bearing surfaces are arranged to be separated by a rotation of said lower support member relative to said upper support member.

* * * * *